United States Patent
Holdsworth et al.

(10) Patent No.: US 7,103,680 B1
(45) Date of Patent: Sep. 5, 2006

(54) PUBLISH/SUBSCRIBE DATA PROCESSING WITH PUBLICATION POINTS FOR CUSTOMIZED MESSAGE PROCESSING

(75) Inventors: Simon Antony James Holdsworth, Andover (GB); Stephen James Paul Todd, Winchester (GB); Malcolm David Ayres, Romsey (GB); Timothy Nicholas Holloway, Lyndhurst (GB); Marc-Thomas Schmidt, Eastleigh (GB); Michael George Taylor, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/558,095

(22) Filed: Apr. 25, 2000

(30) Foreign Application Priority Data

Sep. 28, 1999 (GB) .................................. 9922802.5

(51) Int. Cl.
*G06F 15/16* (2006.01)

(52) U.S. Cl. ...................... 709/246; 709/201; 709/202; 709/206; 709/244; 712/330; 707/10

(58) Field of Classification Search ................ 709/201, 709/206, 330, 246, 202; 707/10, 101
See application file for complete search history.

(56) References Cited

U.S. PATENT DOCUMENTS

| | | | |
|---|---|---|---|
| 5,283,887 A | | 2/1994 | Zachery ...................... 395/500 |
| 5,608,874 A | * | 3/1997 | Ogawa et al. ............... 709/246 |
| 5,873,084 A | * | 2/1999 | Bracho et al. ................ 707/10 |
| 6,044,372 A | * | 3/2000 | Rothfus et al. ............... 707/10 |
| 6,205,482 B1 | * | 3/2001 | Navarre et al. ............. 709/227 |
| 6,298,455 B1 | * | 10/2001 | Knapman et al. ............. 714/43 |
| 6,310,888 B1 | * | 10/2001 | Hamlin ........................ 370/466 |
| 6,321,091 B1 | * | 11/2001 | Holland .................... 455/414.2 |
| 6,324,587 B1 | * | 11/2001 | Trenbeath et al. .......... 709/310 |
| 6,330,617 B1 | * | 12/2001 | Bamforth et al. ........... 709/246 |
| 6,334,151 B1 | * | 12/2001 | Bolam et al. ............... 709/225 |
| 6,405,191 B1 | * | 6/2002 | Bhatt et al. .................... 707/3 |
| 6,405,266 B1 | * | 6/2002 | Bass et al. ................... 709/328 |
| 6,421,570 B1 | * | 7/2002 | McLaughlin et al. .......... 700/2 |
| 6,453,339 B1 | * | 9/2002 | Schultz et al. .............. 709/206 |
| 6,549,956 B1 | * | 4/2003 | Bass et al. ................... 709/328 |
| 6,594,692 B1 | * | 7/2003 | Reisman ..................... 709/219 |

FOREIGN PATENT DOCUMENTS

| | | |
|---|---|---|
| EP | 0 872 990 | 10/1998 |
| GB | 2 267 016 | 11/1993 |
| GB | 2 329 269 | 3/1999 |
| WO | WO 93/23817 | 11/1993 |
| WO | 9522865 | 8/1995 |
| WO | WO 95/22865 | 8/1995 |
| WO | WO 96/18963 | 6/1996 |
| WO | 9820647 | 5/1998 |
| WO | WO 98/20647 | 5/1998 |

* cited by examiner

*Primary Examiner*—Ario Etienne
*Assistant Examiner*—Gregory G Todd
(74) *Attorney, Agent, or Firm*—Duke W. Yee; Jerry W. Herndon; James O. Skarsten

(57) ABSTRACT

A message broker data processing apparatus comprising: a unit for receiving published messages on a topic from a plurality of publisher applications; a unit for processing the received messages; and a unit for distributing the processed messages to a subscriber application; wherein the unit for receiving includes a plurality of publication point data processing nodes, each of which receives published messages on the topic from a publisher application.

4 Claims, 4 Drawing Sheets

PUBLISH/SUBSCRIBE DATA PROCESSING WITH PUBLICATION POINTS FOR CUSTOMIZED MESSAGE PROCESSING

CROSS REFERENCE TO RELATED APPLICATIONS

The present application is related to U.S. Ser. No. 09/510,465 filed Feb. 22, 2000, titled "Publish/subscribe Data Processing with Subscription Points for Customised Message Processing", commonly assigned with the present invention.

FIELD OF THE INVENTION

The present invention relates to the field of data processing and more specifically to event notification data processing which distributes event messages from suppliers (called, hereinafter, "publishers") of data messages to consumers (called, hereinafter "subscribers") of such messages. While there are many different types of known event notification systems, the subsequent discussion will describe the publish/subscribe event notification system as it is one of the most common.

BACKGROUND OF THE INVENTION

Publish/subscribe data processing systems (and event notification systems in general) have become very popular in recent years as a way of distributing data messages (events) from publishing computers to subscribing computers. The increasing popularity of the Internet, which has connected a wide variety of computers all over the world, has helped to make such publish/subscribe systems even more popular. Using the Internet, a World Wide Web browser application (the term "application" or "process" refers to a software program, or portion thereof, running on a computer) can be used in conjunction with the publisher or subscriber in order to graphically display messages. Such systems are especially useful where data supplied by a publisher is constantly changing and a large number of subscribers needs to be quickly updated with the latest data. Perhaps the best example of where this is useful is in the distribution of stock market data.

In such systems, publisher applications of data messages do not need to know the identity or location of the subscriber applications which will receive the messages. The publishers need only connect to a publish/subscribe distribution agent process, which is included in a group of such processes making up a broker network, and send messages to the distribution agent process, specifying the subject of the message to the distribution agent process. The distribution agent process then distributes the published messages to subscriber applications which have previously indicated to the broker network that they would like to receive data messages on particular subjects. Thus, the subscribers also do not need to know the identity or location of the publishers. The subscribers need only connect to a distribution agent process.

One such publish/subscribe system which is currently in use, and which has been developed by the Transarc Corp. (a wholly owned subsidiary of the assignee of the present patent application, IBM Corp.) is shown in FIG. 1. Publishers 110 and 120 connect to the publish/subscribe broker network 2 and send published messages to broker network 2 which distributes the messages to subscribers 31, 32, 33, 34. Publishers 110 and 120, which are data processing applications which output data messages, connect to broker network 2 using the well known inter-application data connection protocol known as remote procedure call (or RPC) (other well known protocols, such as asynchronous message queuing protocols, can also be used). Each publisher application could be running on a separate machine, alternatively, a single machine could be running a plurality of publisher applications. The broker network 2 is made up of a plurality of distribution agents (21 through 27) which are connected in a hierarchical fashion which will be described below as a "tree structure". These distribution agents, each of which could be running on a separate machine, are data processing applications which distribute data messages through the broker network 2 from publishers to subscribers. Subscriber applications 31, 32, 33 and 34 connect to the broker network 2 via RPC in order to receive published messages.

Publishers 110 and 120 first connect via RPC directly to a root distribution agent 21 which in turn connects via RPC to second level distribution agents 22 and 23 which in turn connect via RPC to third level distribution agents 24, 25, 26 and 27 (also known as "leaf distribution agents" since they are the final distribution agents in the tree structure). Each distribution agent could be running on its own machine, or alternatively, groups of distribution agents could be running on the same machine. The leaf distribution agents connect via RPC to subscriber applications 31 through 34, each of which could be running on its own machine.

In order to allow the broker network 2 to determine which published messages should be sent to which subscribers, publishers provide the root distribution agent 21 with the name of a distribution stream for each published message. A distribution stream (called hereinafter a "stream") is an ordered sequence of messages having a name (e.g., "stock" for a stream of stock market quotes) to distinguish the stream from other streams (this is known as "topic based" publish/subscribe, another well known model is called "content based publish/subscribe which involves matching publishers and subscribers by the content of the messages rather than by the topic). Likewise, subscribers provide the leaf distribution agents 31 through 34 with the name of the streams to which they would like to subscribe. In this way, the broker network 2 keeps track of which subscribers are interested in which streams so that when publishers publish messages to such streams, the messages can be distributed to the corresponding subscribers. Subscribers are also allowed to provide filter expressions to the broker network in order to limit the messages which will be received on a particular stream (e.g., a subscriber 31 interested in only IBM stock quotes could subscribe to the stream "stock" by making an RPC call to leaf distribution agent 24 and include a filter expression stating that only messages on the "stock" stream relating to IBM stock should be sent to subscriber 31).

The above-described publish/subscribe architecture provides the advantage of central co-ordination of all published messages, since all publishers must connect to the same distribution agent (the root) in order to publish a message to the broker network. For example, total ordering of published messages throughout the broker network is greatly facilitated, since the root can easily assign sequence numbers to each published message on a stream. However, this architecture also has the disadvantage of publisher inflexibility, since each publisher is constrained to publishing from the single root distribution agent, even when it would be much easier for a publisher to connect to a closer distribution agent.

In the FIG. 1, a publisher application 110, running on one computer, is, for example, a supplier of live stock market data quotes. That is, publisher application 110 provides frequent messages stating the present value of share prices. In this example, publisher application 110 is publishing messages on a stream called "stock" which has already been configured in the broker network 2. As is well known, when publisher 110 wishes to publish a stock quote message to stream "stock", publisher 110 makes an RPC call to the root distribution agent 21 which is at the top level of the broker network tree structure. In this example, subscriber application 32, running on another computer, has sent a subscription request via an RPC call to leaf distribution agent 24, which is at the bottom level of the tree structure, indicating that subscriber 32 would like to subscribe to stream "stock".

Thus whenever publisher 110 publishes a data message to stream "stock" the distribution tree structure of broker network 2 channels the message down through the root distribution agent 21, through any intermediary distribution agents (e.g., 22 in the example of FIG. 1) and through the leaf distribution agent 24 to the subscriber 32. This involves a series of RPC calls being made between each successive circle in the diagram of FIG. 1 connecting publisher 110 and subscriber 32 (i.e., 110 to 21, 21, to 22, 22 to 24 and 24 to 32).

FIG. 2 shows a different publish/subscribe architecture where publisher applications can publish messages to the broker network by directly communicating with any one of a plurality of distribution agents (brokers). For example, publisher application 201 is shown communicating directly with Broker 12. There is no requirement in this architecture that all publisher applications communicate directly with a top (or root) distribution agent. Publisher application 201 can potentially communicate directly with any of the distribution agents shown in FIG. 2, in the described examples below it will be shown communicating directly with Broker 12.

Subscriber applications 202 and 203 would like to receive messages on the stream/topic that publisher application 201 is publishing on. Thus, subscriber applications 202 and 203 communicate directly with Brokers 1112 and 1221, respectively, to provide subscription data thereto informing the broker hierarchy of their desire to receive such published messages. Since the publisher application 201 is allowed to communicate directly with any of a plurality of distribution agents, the subscription data entered by the subscriber applications must be propagated throughout the broker network to each Broker shown in FIG. 2. This way, no matter which distribution agent the publisher application 201 happens to communicate directly with, the published messages will be able to be routed to the subscriber applications 202 and 203.

Publish/subscribe broker systems have commonly been integrated into multi-function message broker systems which are used to inter-connect applications which may be on heterogeneous platforms and may use different message formats. For example, Saga Software of Reston, Va. (USA) (www.sagasoftware.com) have such a message broker product called "Sagavista" (a trademark of Saga Software). Further, Tibco Software Inc. of Palo Alto, Calif. (USA) (www.tibco.com) also have such a message broker called "TIB/Message Broker" (both "TIB" and "TIB/Message Broker" are trademarks of Tibco). In these multi-function message brokers, a set of pluggable data processing nodes is provided, with each node being dedicated to a specific data processing task, such as message format transformation, publish/subscribe message distribution, and a rules engine for deciding (based on a plurality of predefined rules) where an incoming message should be routed.

In these multi-function message broker products, when a subscriber application registers a subscription request with the broker, the subscriber application sends the subscription request to a publish/subscribe broker node specifying the topic of the desired subscription. The publish/subscribe broker node (usually in cooperation with a plurality of other such publish/subscribe broker nodes) then ensures that any published messages on that topic are sent to the subscriber application. Different subscribers may wish to receive the same published messages but in different message formats (or may desire that some other type of processing be carried out on published messages before such messages are delivered to the subscriber). For example, a subscriber in the United States may want to know IBM's stock price per share in US dollars while another subscriber in the United Kingdom may want to know IBM's stock price in UK (British) pounds.

In order to accommodate such format desires of various subscribers, the message broker would have to modify the topic after having performed a format transformation so that a subscriber can subscribe to this modified topic (rather than the original topic that the publisher published on) in order to receive the format-transformed messages. Alternatively, the publishers would have to publish the same messages in different formats (with each format having its own topic), thus doing away with the need for the broker to do the format transformation. Because the topic needs to correspond to the format in both of these cases, this can cause many problems. For example, it is very useful to carry out access control on a topic basis. That is, when deciding which subscribers can have access to which published messages, it is very useful to be able to use the topics of the messages to make such access control decisions. However, when the topics must be different for essentially the same group of messages because of format changes, such access control decisions become much more complex.

It would be clearly desirable to be able to use the same topic for a variety of different message formats in a message broker, but the present state of the art does not allow for this.

SUMMARY OF THE INVENTION

According to one aspect, the present invention provides a message broker data processing apparatus including: a unit for receiving published messages on a topic from a plurality of publisher applications; a unit for processing the received messages; and a unit for distributing the processed messages to a subscriber application; where the unit for receiving includes a plurality of publication point data processing nodes, each of which receives published messages on the topic from a publisher application.

According to a second aspect, the present invention provides a data processing method of carrying out the functionality discussed above with respect to the first aspect.

According to a third aspect, the present invention provides a computer readable storage medium having a computer program stored on it which, when executed on a computer, carries out the functionality of data processing method of the second aspect of the invention.

Thus, the present invention provides a message broker having a publish/subscribe capability where a publisher application can publish messages in a manner which is most convenient to that publisher application, and a subscriber application will receive such published messages after the messages have undergone specific data processing, all without the need for the topic names used by the publisher application, broker and subscriber application to be modified. For example, the publisher, broker and subscriber can use the same topic name even though the messages sent under this topic will be of differing formats. The presence of multiple publication points, selectable by a particular publisher application, within the broker provides for this ability.

As one advantage of the invention, access control can thus be easily carried out using the topic name. Further, the publisher application does not need to publish the same messages on a plurality of topics in order to accommodate subscribers who want publications in differing formats, thus decoupling the publisher application from having to deal with the varying desires of subscribers. The publisher need only publish messages in the format most convenient to that publisher.

BRIEF DESCRIPTION OF THE DRAWINGS

The invention will be better understood by referring to the detailed description of the preferred embodiments which will now be described in conjunction with the following drawing figures.

DETAILED DESCRIPTION OF THE PREFERRED EMBODIMENTS

Figure 1:
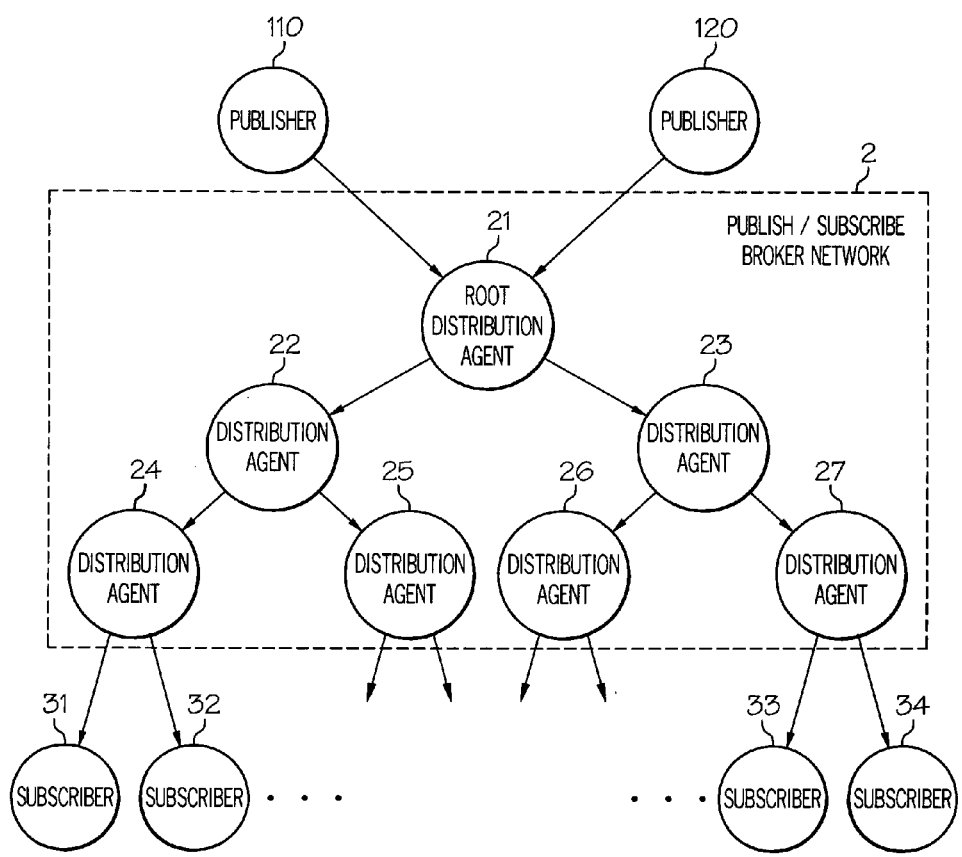
FIG. 1 is a block diagram showing a first architecture of a publish/subscribe data processing system to which the preferred embodiment of the present invention can be advantageously applied.
Figure 2:
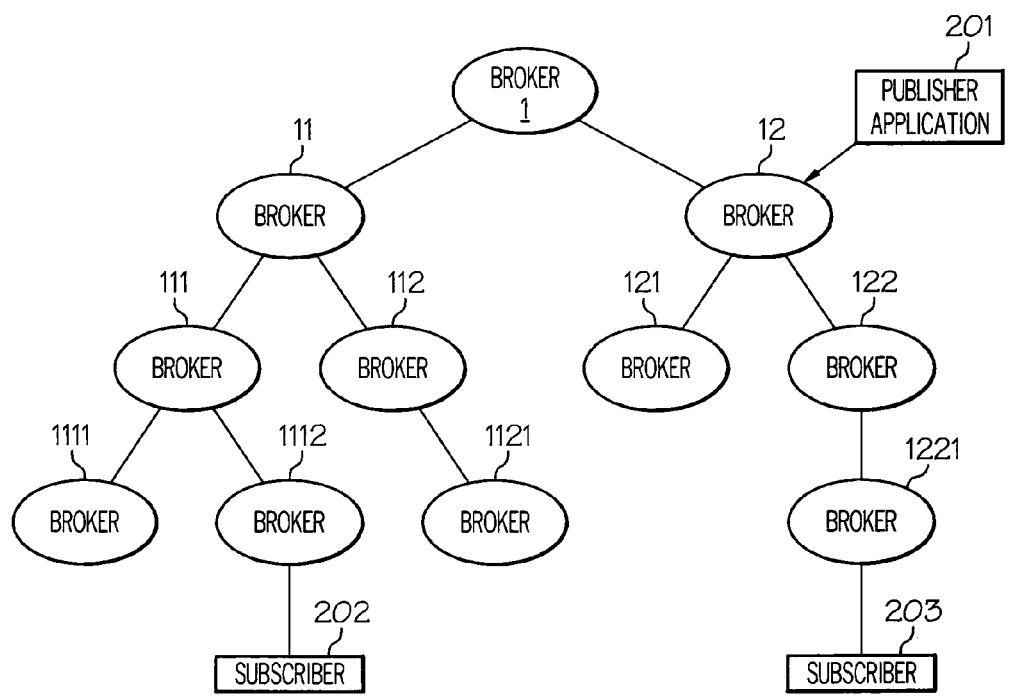
FIG. 2 is a block diagram showing a second architecture of a publish/subscribe data processing system to which the preferred embodiment of the present invention can be advantageously applied.
Figure 3:
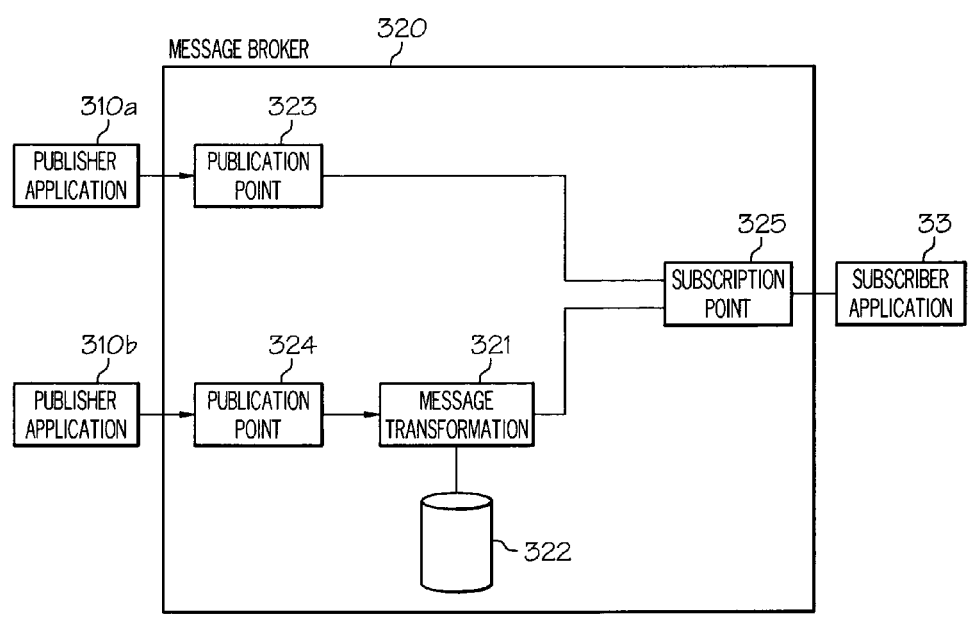
FIG. 3 is a block diagram showing an exemplary message broker according to a preferred embodiment of the present invention.

In FIG. 3 a message broker 320 receives published messages on a topic called "IBM stock" from a publisher application 310a (which is an application running at a major stock exchange in the United States of America) and distributes such published messages to subscriber application 33 (which is a stock broking agency also located in the United States of America) which has previously registered a subscription to the topic "IBM stock". Message broker 320 also receives published messages on the topic "IBM stock" from another publisher application 310b (which is an application running at a major stock exchange in the United Kingdom) and distributes such published messages to subscriber application 33 (again, which is a stock broking agency located in the United States of America) which has previously registered a subscription to the topic "IBM stock". In this example, the publisher application, broker and subscriber applications are all running on separate machines (and are thus interconnected via a network which is not shown in FIG. 3). In other embodiments, however, two or more of the applications (e.g., the publisher and the broker) could be running on the same machine. Further, as was explained above, the broker 320 is most likely running on a plurality of machines.

When one of the publisher applications 310a or 310b communicates with the broker 320 in order to publish messages thereto, the publisher application specifies a particular publication point (e.g., 323 or 324) as the point of entry into the message broker 32. A publication point data processing node (or "publication point" for short) is a data processing node which acts as a point of entry for published messages in a messageflow of data processing nodes making up a message broker. That is, each publication point is at the beginning of a specific data processing path through the broker. A publisher application selects a publication point depending on which particular desired path the published messages should take depending on the nature of the published messages and the nature of the processing that will be carried out on that path.

For example, publisher application 310b selects publication point 324 because publisher application 310b is located in the United Kingdom and thus publisher application 310b "knows" that a message transformation will be needed. Specifically, once the publisher application 310b's published messages pass through the publication point 324, they are passed to message transformation data processing node 321 which performs the function of transforming the format of the published messages so that the IBM stock prices, which are originally published in UK pounds by publisher application 310b, are converted to US dollars. The message transformation node 321 accesses local storage 322 in order to determine the current exchange rate of UK pounds to US dollars (this exchange rate is updated at the beginning of every business day). After having their UK pound amounts converted to US dollars, the messages are output from the message transformation node 321 and received at a subscription point processing node 325.

A subscription point data processing node (or "subscription point" for short) is an instance of a publish/subscribe matching engine which performs the function of looking at the topics in previously received subscription requests (received from subscribers) and determining whether the topic in an incoming message (just received from a publisher application) matches the topic of any of the previously received subscription requests. For any subscriptions that match, the subscription point data processing node distributes the published message to the subscriber application(s) which had entered the subscription requests.

Back to FIG. 3, the subscription point processing node 325 determines (e.g., by accessing local storage 322) that subscriber application 33 has previously entered a subscription on the topic "IBM stock". Thus, subscription point processing node 325 distributes the published messages to subscriber application 33.

On the other hand, publisher application 310a communicates with the broker 320 via another publication point 323, and thus published messages from publisher 310a take another path through the broker bypassing the message transformation data processing node 321. Specifically, the published messages from publisher 310a are sent directly to subscription point data processing node 325. Publisher application 310a chooses to communicate with publication point 323 because publisher application 310a is located in the United States and thus the published messages are already in the US dollars format, and thus there is no need to transform the messages to the US dollars format, which is the format required by the subscriber application 33. Subscription point data processing node 325 then performs a publish/subscribe topic matching operation and determines that subscriber application 33 has previously entered a subscription request to the topic "IBM stock". Thus, subscription point processing node 325 distributes the published messages to subscriber application 33.

Thus, by the use of a plurality (two in FIG. 3) of publication point data processing nodes in a message broker, publisher applications can select amongst the plurality of publication points in order to publish messages which will be received by subscribers in a message format selected by the subscriber without having to use different topics (the topic "IBM stock" is the same for both publication points 323 and 324 and for both publisher applications 310a and 310b). This allows access control to be easily carried out on a topic basis. For example, the broker can perform a security measure on both publisher applications 310a and 310b by simply checking whether the requested topic "IBM stock" of their published messages is a topic which has previously been determined as acceptable for publishers 310a and 310b from a security standpoint.

In a multi-broker environment the subscription point at each of several brokers is connected to the subscription point at other brokers exactly as described for simple publish/subscribe systems. The message is published to a publication point at an initial receiving broker (IRB). Broker IRB process the message according to the publication point on which it was published. The processing in broker IRB may cause the message (or one or more derivations of the message) to reach the subscription point at broker IRB. Once a message (original or derivative) reaches the subscription point at broker IRB it is made available to subscribers on other brokers using standard interbroker publish/subscribe technology. This mechanism of this inter broker publish/subscribe technology operates independently from the mechanism by which the message reaches the subscription point at broker IRB.

The use of publication points in message flows through the broker is not limited to knowledge of a downstream message format transformation. Such publication points could be used in a wide variety of different contexts.

Figure 4:
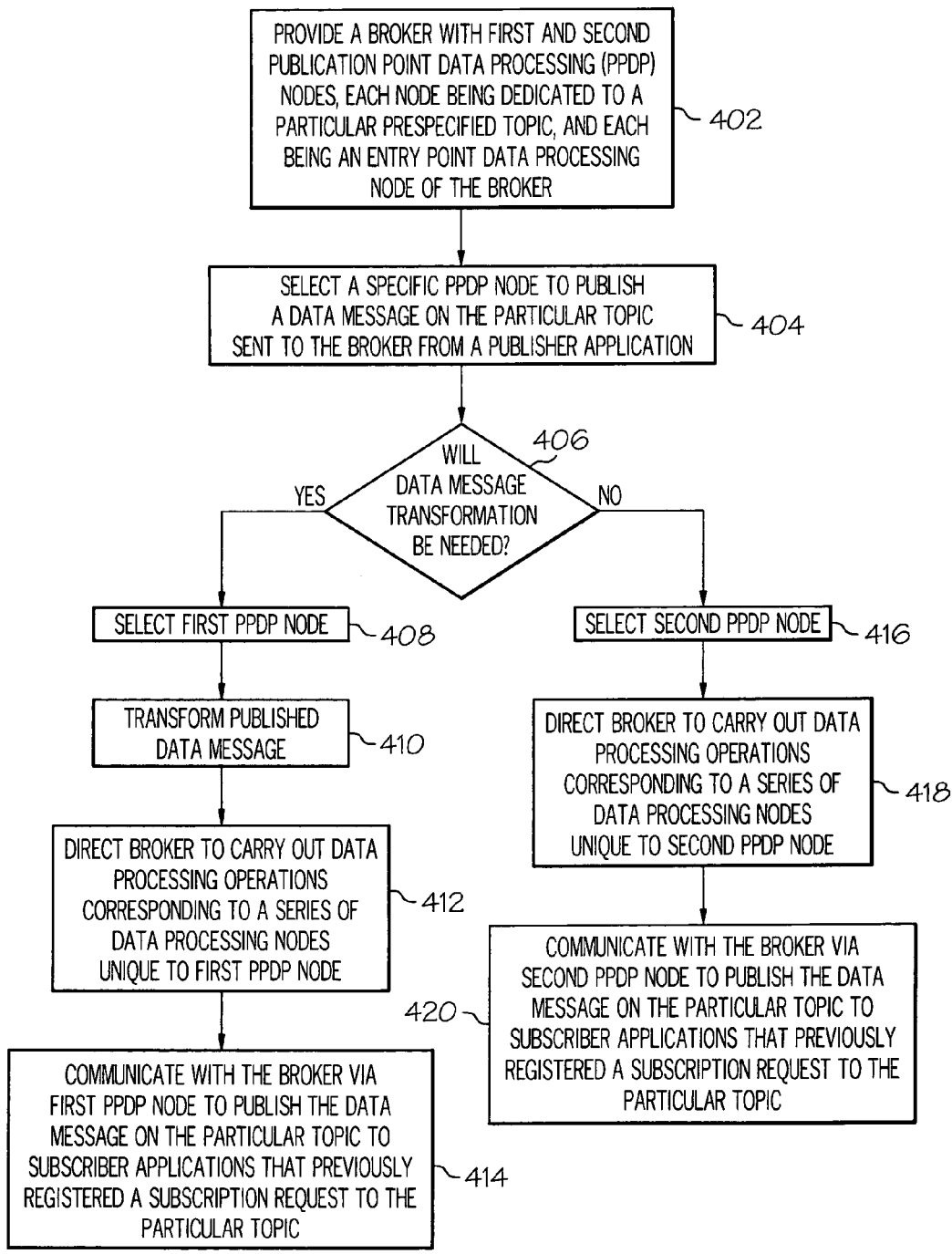
FIG. 4 is a flow diagram depicting steps of a preferred embodiment of the invention.

FIG. 4 is a flow diagram further illustrating steps of an embodiment of the invention. Function block 402 indicates that a broker such as broker 32 is provided with first and second publication point data processing nodes, each node being dedicated to a particular prespecified topic and each being an entry point data processing node of the broker. A specific publication point data processing node is then selected, to publish a data message on the particular topic, as indicated by function block 404. Function block 404 further teaches that the particular topic is sent to the broker from a publisher application.

In accordance with decision block 406 of FIG. 4, it is necessary to determine whether or not data message transformation will be needed. If such determination is positive, the first publication point data processing node will be selected, as shown by function block 408, and the data message will then be transformed, as shown by function block 410. Thereafter, the broker carries out data processing operations corresponding to a series of data processing nodes unique to the first node, as indicated by function block 412. Finally, in accordance with function block 414, a communication is made with the broker via the first publication point data processing node, to publish the data message on the particular topic to subscriber applications that previously registered a subscription request to the particular topic.

Referring further to FIG. 4, function block 416 shows that if data message transformation is not needed, the second publication point data processing node will be selected. Steps indicated by function blocks 418 and 420 will then be sequentially carried out. The steps of function blocks 418 and 420 correspond to those of function blocks 412 and 414, respectively, except that function blocks 418 and 420 pertain to the second rather than the first publication point data processing node.

What is claimed is:

1. A method of publishing a data message on a particular prespecified topic from a publisher application to a subscriber application via a broker, comprising the steps of:

selecting a specific publication point data processing node of the broker from amongst a plurality of such publication point data processing nodes, each of said plurality of publication point data processing nodes being dedicated to said particular prespecified topic, a publication point data processing node being an entry point data processing node of the broker, such entry point node being followed by a series of other data processing nodes where each node in the series carries out a specific data processing operation on the data message, where each publication point data processing node of said plurality of publication point data processing nodes is followed by a series of data processing nodes unique to the respective publication point data processing node, and where the broker acts as an intermediary between the publisher application and the subscriber application, thus making it unnecessary for the publisher application, and the subscriber application to know any details about each other because said particular prespecified the broker uses a topic is associated with a data message received from a publisher application, and is used by the broker in order to determine which message should be sent to which subscriber application by sending the message to the subscriber applications that have previously registered a subscription request for said particular prespecified the topic, wherein the broker is a separate entity from the publisher application and subscriber application, and communicating with the broker via the selected publication point data processing node, in order to publish the data message on said particular prespecified topic via the broker to subscriber applications that have previously registered a subscription request to said particular prespccified topic, with the broker carrying out the data processing operations corresponding to the series of data processing nodes unique to the selected publication point data processing node, in order to process the data message in a different way depending on, which publication point data processing node is selected even though each of the plurality of publication point data processing nodes are dedicated to said particular prespecified topic.

2. The method of claim 1 wherein a first publication point data processing node is followed by a message transformation node and a second publication point data processing node is not followed by a massage transformation node, whereby, when the first publication point data processing node is selected, published messages undergo transformation by the message transformation node and when the second publication point data processing node is selected, published messages will not undergo transformation by the message transformation node.

3. The method of claim 2 wherein the publisher application selects the first publication point data processing node if message transformation is to take place or selects the second publication point data processing node if message transformation is not to take place.

4. A computer program product, stored on a computer readable storage medium, for, when run on a computer system, instructing the computer system to carry out the method of claim 1.

* * * * *

UNITED STATES PATENT AND TRADEMARK OFFICE
CERTIFICATE OF CORRECTION

PATENT NO. : 7,103,680 B1 Page 1 of 1
APPLICATION NO. : 09/558095
DATED : September 5, 2006
INVENTOR(S) : Holdsworth et al.

It is certified that error appears in the above-identified patent and that said Letters Patent is hereby corrected as shown below:

Col. 8, line 21: before "topic" delete "the broker uses a".

Col. 8, line 27: before "topic" delete "the".

Col. 8, line 40: after "on" delete ",".

Signed and Sealed this

Twelfth Day of December, 2006

JON W. DUDAS
*Director of the United States Patent and Trademark Office*